(12) United States Patent
Grein et al.

(10) Patent No.: US 10,473,010 B2
(45) Date of Patent: Nov. 12, 2019

(54) SEPARATION ELEMENT OF LIQUID SEPARATOR, SEPARATION MEDIUM, LIQUID SEPARATOR, AND METHOD FOR PRODUCING SEPARATION ELEMENT

(71) Applicant: MANN+HUMMEL GMBH, Ludwigsburg (DE)

(72) Inventors: Thomas Grein, Eggenstein-Leopoldshafen (DE); Markus Zuerker, Dudenhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 605 days.

(21) Appl. No.: 15/196,839

(22) Filed: Jun. 29, 2016

(65) Prior Publication Data

US 2017/0002705 A1    Jan. 5, 2017

(30) Foreign Application Priority Data

Jul. 1, 2015   (DE) ........................ 10 2015 008 329

(51) Int. Cl.
*F01M 13/04* (2006.01)
*B01D 46/00* (2006.01)
*B01D 39/20* (2006.01)
*B01D 46/52* (2006.01)
*B01D 46/24* (2006.01)
*F01M 13/00* (2006.01)

(52) U.S. Cl.
CPC ......... *F01M 13/04* (2013.01); *B01D 39/2017* (2013.01); *B01D 46/003* (2013.01); *B01D 46/0005* (2013.01); *B01D 46/2411* (2013.01); *B01D 46/528* (2013.01); *F01M 13/0011* (2013.01); *F01M 2013/0016* (2013.01); *F01M 2013/0055* (2013.01); *F01M 2013/0438* (2013.01)

(58) Field of Classification Search
None
See application file for complete search history.

(56) References Cited

U.S. PATENT DOCUMENTS

| | | | |
|---|---|---|---|
| 3,687,293 A * | 8/1972 | Carter | B01D 61/28 210/321.74 |
| 4,102,785 A | 7/1978 | Head | |
| 4,476,022 A * | 10/1984 | Doll | B01D 63/103 210/321.83 |
| 4,820,413 A * | 4/1989 | Lopez | B01D 63/10 210/321.83 |

(Continued)

*Primary Examiner* — Bobby Ramdhanie
*Assistant Examiner* — Brit E. Anbacht
(74) *Attorney, Agent, or Firm* — James Hasselbeck

(57) ABSTRACT

Disclosed are: a separation element (20) of a liquid separator (10) for the separation of liquid from an aerosol; a separation medium (38); a liquid separator (10); and a method for producing a separation element. The separation element (20) has at least one separation medium (38) for separating at least the liquid, the separation medium being arranged circumferentially about an element axis (22) in at least one medium layer (40). The aerosol is able to flow through the separation element (20) radially relative to the element axis (22). At least one medium layer (40) has, on a radially inward circumferential surface, at least one channel-shaped indentation (42) extending axially to the element axis (22) to realize at least one channel (44) for separated liquid.

11 Claims, 3 Drawing Sheets

(56) References Cited

U.S. PATENT DOCUMENTS

| | | | | |
|---|---|---|---|---|
| 4,834,881 A * | 5/1989 | Sawada | B01D 63/10 | 210/321.74 |
| 4,902,417 A * | 2/1990 | Lien | B01D 63/10 | 210/321.74 |
| 5,096,591 A * | 3/1992 | Benn | B01D 63/10 | 210/247 |
| 5,800,584 A | 9/1998 | Hinderer | | |
| 6,235,089 B1 | 5/2001 | Erdmannsdoerfer | | |
| 6,632,357 B1 * | 10/2003 | Barger | B01D 63/08 | 210/321.74 |
| 6,962,615 B2 | 11/2005 | Staudenmayer et al. | | |
| 2002/0162784 A1 * | 11/2002 | Kohlheb | B01D 63/10 | 210/321.6 |
| 2005/0155923 A1 * | 7/2005 | Diemer | B01D 29/216 | 210/345 |
| 2005/0223687 A1 * | 10/2005 | Miller | B01D 46/0001 | 55/521 |
| 2006/0219635 A1 * | 10/2006 | McCague | C25D 13/24 | 210/651 |
| 2008/0223781 A1 * | 9/2008 | Diemer | B01D 29/216 | 210/502.1 |
| 2008/0290031 A1 * | 11/2008 | Popa | B01D 63/082 | 210/650 |
| 2011/0062076 A1 * | 3/2011 | Lee | B01D 63/10 | 210/437 |
| 2011/0127206 A1 * | 6/2011 | Meyer-Blumenroth | B01D 63/043 | 210/232 |
| 2011/0186505 A1 * | 8/2011 | Diemer | B01D 29/216 | 210/494.3 |
| 2011/0233152 A1 * | 9/2011 | Wieczorek | B01D 17/045 | 210/799 |
| 2012/0261333 A1 * | 10/2012 | Moran | B01D 63/10 | 210/500.23 |
| 2012/0328844 A1 * | 12/2012 | Zounek | B01D 63/08 | 428/174 |
| 2015/0240606 A1 * | 8/2015 | Dowsett | E21B 43/084 | 166/230 |
| 2018/0161729 A1 * | 6/2018 | Yaeger | B01D 63/106 | |

* cited by examiner

SEPARATION ELEMENT OF LIQUID SEPARATOR, SEPARATION MEDIUM, LIQUID SEPARATOR, AND METHOD FOR PRODUCING SEPARATION ELEMENT

TECHNICAL FIELD

The invention relates to a separation element of a liquid separator, in particular, an oil separator, in particular, of a crankcase ventilation system of an internal combustion engine, a compressor air/oil separator, or an air/oil separator box, for the separation of liquid from an aerosol.

The invention also relates to a separation medium of a separation element of a liquid separator, in particular, an oil separator, in particular, of a crankcase ventilation system of an internal combustion engine, a compressor air/oil separator, or an air/oil separator box, for the separation of liquid from an aerosol.

Furthermore, the invention relates to a liquid separator, in particular, an oil separator, in particular, of a crankcase ventilation system of an internal combustion engine, a compressor air/oil separator, or an air/oil separator box, for the separation of liquid from an aerosol, the liquid separator comprising a housing having at least one aerosol inlet for the aerosol and at least one gas outlet for gas liberated from the liquid, and at least one separator element having at least one separation medium for the separation of the liquid.

Finally, the invention also relates to a method for producing a separation element of a liquid separator, in particular, an oil separator, in particular, of a crankcase ventilation system of an internal combustion engine, a compressor air/oil separator, or an air/oil separator box, for the separation of liquid from an aerosol.

BACKGROUND

Separation elements known in the prior art, which have wound medium layers for separating liquid droplets or liquid aerosols from gases, comprise media that are selected for each respective product so that said media can be wound in a kink-free manner.

U.S. Pat. No. 4,915,714 A discloses a fiber layer element and a method for using such an element to remove and collect small particles from liquids, or soluble solids from gas streams. The element is formed from one or more fibrous layers perforated by holes and supported by an appropriate support structure. The fiber layers are subjected to pressure, in order to achieve a desired thickness. The punched holes then contribute to creating discharge channels through which the liquids can flow out.

The invention addresses the problem of creating a separation element, a separation medium, a liquid separator, and a method of the aforementioned type, with which it is as simple as possible to achieve the most efficient discharge of liquid possible.

SUMMARY

The problem is solved according to the invention, in that the separation element comprises at least one separation medium for separating at least the liquid that is arranged in at least one medium layer circumferentially about an element axis, wherein the aerosol can flow through the separation element, for example, radially outwardly from radially inward or radially inwardly from radially outward, relative to the element axis, wherein the element axis extends vertically in space with at least one directional component in the normal operational orientation of the separation element, and wherein at least one medium layer of at least one separation medium has, on a circumferential surface that is radially inward relative to the element axis, a channel-shaped indentation extending axially to the element axis at least with one directional component, for example, in order to realize at least one channel, in particular, a discharge or drainage channel, for separated liquid.

According to the invention, at least one medium layer has at least one separation medium on a circumferential surface of at least one channel-shaped indentation that is radially inward relative to the element axis. The at least one channel-shaped indentation extends axially to the element axis with at least one directional component. The element axis is arranged vertically in space with at least one directional component in the normal operational orientation of the separation element. In this manner, a channel is formed. This channel can act as a discharge channel or drainage channel, in particular, for the liquid entering the channel. The channel is preferably arranged vertically in space either at least with one directional component or completely. Separated liquid can then follow the force of gravity and run spatially downward in the at least one channel. It is thus easy to implement efficient discharging of the separated liquid. Depending on the direction of flow of the aerosol through the at least one separation medium, the at least one indentation is located on the inflow side or outflow side of the corresponding medium layer. The separated liquid can reach the channel ahead of or behind the corresponding medium layer in the direction of flow.

Advantageously, a plurality of medium layers made of separation medium may be arranged in a layered manner. With a plurality of medium layers, a medium winding can thus be realized. Then, a radially outward circumferential surface of at least one medium layer laid radially further inward may delimit an indentation on the radially inward circumferential surface of an adjacent medium layer laid radially further outward. In this manner, at least one channel can be realized. The channel may advantageously act as a drainage channel. In one embodiment, the channel may be circumferentially closed, in particular, relative to the longitudinal direction thereof.

Alternatively, different material layers may also be arranged between the medium layers with the separation medium. In this case, the different material layers delimit there the corresponding at least one channel.

Advantageously, at least one separation medium may comprise at least one coalescence medium or be composed thereof. With a coalescence medium, even the smallest liquid droplets can be combined—in particular, coalesced—into larger liquid drops. The larger liquid drops can in turn be separated out and discharged in the at least one channel.

Advantageously, the separation element—in particular, at least one separation medium—may have a plurality of channels-shaped indentations. In this manner, the separated liquid can be discharged at a plurality of places in the separation element.

Advantageously, the liquid separator may be or have an oil separator, which may be arranged in a crankcase ventilation system of an internal combustion engine. Advantageously, the aerosol may be crankcase gas (blowby gas) from the crankcase of the internal combustion engine. Advantageously, the liquid to be separated may comprise or be composed of oil, in particular, motor oil. With the separation element, it is possible to separate out motor oil or other drop-shaped components such as water, fuel, or the like entrained in the blowby gas. The separated motor oil may be fed back to a motor oil circuit of the internal combustion engine. The blowby gas, liberated from the motor oil, may be fed to an air intake conduit or discharged to the environment.

However, the invention is not limited here to an oil separator of a crankcase ventilation system of an internal combustion engine of a motor vehicle. The invention may also be used outside of motor vehicle technology, in particular, with industrial engines. The invention may also be applied with different droplet separators or liquid separators, in particular, for compressor air/oil separation or with air/oil separator boxes.

In one advantageous embodiment, at least one part of the at least one separation medium may be wound circumferentially about the element axis in a plurality of medium layers. Winding makes it easy to realize a plurality of medium layers. In this manner, the separation element can be obtained from one piece—in particular, a medium web— of a corresponding separation medium.

Advantageously, the at least one separation medium may be wound about a winding core. Advantageously, the winding core may at least comprise a component already being used for the liquid separator, in particular, a support tube of the separator element or for the separator element. This obviates the need to separate the separation medium from the winding core after the winding. Alternatively, a separate winding core may be used, for example, in the form of a fabric tube or another tubular and fluid-permeable structure such as an expanded mesh, a perforated plate, or the like.

In another advantageous embodiment, a plurality of channel-shaped indentations may be arranged so as to be uniformly distributed circumferentially, and/or a plurality of channel-shaped indentations may be arranged so as to be non-uniformly distributed circumferentially. In this manner, a plurality of discharge channels can be realized at different places on the at least one medium layer, in particular, within the medium winding formed by a plurality of medium layers, over correspondingly large parts of the circumference, in particular, over the entire circumference. Thus, separated liquid can be discharged at a plurality of places on the separation element. The efficiency of the liquid discharge can thus be further improved.

Advantageously, a plurality of channel-shaped indentations may be arranged so as to be uniformly distributed. In this manner, the liquid can be discharged more uniformly.

Alternatively or additionally, a plurality of channel-shaped indentations may be arranged so as to be non-uniformly distributed. Different material properties of the separation medium along the circumference or—with a plurality of material layers—different radial distances of the corresponding indentations to the element axis may thus be taken into account, and/or may influence the distribution of the indentations when the separation element is being produced. Overall, the liquid discharge in the entire separation element can be improved.

In another advantageous embodiment, at least two channel-shaped indentations may be different with respect to the respective cross-sections—in particular, the shapes thereof and/or the cross-sectional surfaces thereof—transversely to the flow path of the separated liquid, and/or at least two channel-shaped indentations may be identical with respect to the respective cross-sections thereof. In this manner, the separation channels can be specifically adapted to different requirements.

Advantageously, at least two indentations may have different cross-sectional surfaces, such that the flow cross-sections for the separated liquid are different.

Alternatively or additionally, the shapes of the cross-sections of at least two indentations may be different. In particular, the at least two indentations may extend with different circumferential widths relative to the element axis, so as to be able each to cover a differently-sized circumferential region.

Alternatively or additionally, at least two channel-shaped indentations may be identical in the cross-sections thereof— in particular, the shape and/or cross-sectional surface thereof. It is then possible to have uniform discharging of the liquid.

Overall, appropriately selecting the cross-section of the channel-shaped indentations makes it possible to adapt—in particular, to vary—the characteristic of the fluid discharge.

In another advantageous embodiment, at least one channel-shaped indentation may extend to a margin of the at least one separation medium that is spatially downward in the normal operational orientation—in particular, over the entire axial extension of the at least one separation medium relative to the element axis. In this manner, the liquid can be guided to the spatially downward end face of the separation element, and discharged there from the separation element.

Advantageously, the at least one channel-shaped indentation—in particular, the at least one channel—may be open to a downward end face of the at least one separation medium, in particular, to both end faces of the separation medium. The at least one opening of the at least one channel-shaped indentation makes it possible for the separated liquid to depart from the at least one separation medium.

Advantageously, at least one channel-shaped indentation may extend over the entire axial extension of the at least one separation medium relative to the element axis. In this manner, the liquid can be guided continuously through the separation element, from the axially upward end face relative to the element axis in the normal operational orientation to the axially downward end face.

In another advantageous embodiment, at least one separation medium in the region of at least one channel-shaped indentation may be bent exclusively at the radially inward circumferential surface thereof or at the radially inward and radially outward circumferential surfaces. In this manner, corresponding indentations are located at least on the radially inward circumferential surface.

Advantageously, at least one channel-shaped indentation bent radially outward is realized exclusively at the radially inward circumferential surface of the at least one separation medium. The radially outward circumferential surface of the at least one separation medium lying opposite to the at least one indentation may be realized without corresponding bends and follow a uniform course. Thus, a radial extension—in particular, thickness—of the corresponding medium layer of the at least one separation medium can be lower overall.

Alternatively, the at least one separation medium in the region of at least one indentation may be bent at the radially inward and radially outward circumferential surfaces thereof. Alternatively, the at least one separation medium in the region of at least one indentation may be bent at the radially inward and radially outward circumferential surfaces thereof. In this manner, less—in particular, no— compression of the material of the at least one separation medium between the radially outward circumferential surface and the radially inward circumferential surface is required.

In another advantageous embodiment, the at least one separation medium may have at least one embossment and/or punch along at least one channel-shaped indentation, at least on the radially inward circumferential surface relative to the element axis. With the at least one embossment and/or punch, a predetermined bending region—in particular, a predetermined bending line—can be realized, along which the radially inward circumferential surface can be bent to the at least one channel-shaped indentation. A corresponding shaping—in particular, bending—of the at least one channel-shaped indentation can thus be realized in an easier and more precise manner. The at least one embossment and/or punch makes it possible for the position and contour of the at least one indentation to be more precisely defined.

In another advantageous embodiment, the at least one separation medium may be non-stretchable along the radially inward and radially outward circumferential surfaces thereof relative to the element axis. In this manner, the stability of the at least one separation medium can be improved. A more stable shape design can be realized.

Advantageously, the at least one separation medium may be non-stretchable at the circumferential surfaces thereof under normal operational conditions and/or under normal production conditions. This makes it possible to prevent the circumferential surfaces from being able to stretch during production or operation. It is thus possible to prevent the at least one separation medium from stretching or swelling during operation. In addition, the radially inward circumferential surface can be successfully bent or folded over along corresponding regions—in particular, lines—when the at least one separation medium is laid—in particular, wound—uniformly and in particular cylindrically relative to the element axis. Channel-shaped indentations can thus automatically be created at the corresponding fold regions or bend regions. In this manner, realizing the at least one channel-shaped indentation does not necessitate separate production steps or tools.

In another advantageous embodiment, at least one separation medium may be compressed in the radial direction relative to the element axis along at least one channel-shaped indentation. In this manner, the radially outward circumferential surface and the radially inward circumferential surface of the at least one separation medium can be moved relative to one another in order to produce the at least one indentation. Combining the compressibility of the material between the circumferential surfaces and the non-stretchability in the region of the circumferential surfaces of the at least one separation medium makes it possible to easily—in particular, automatically—realize the at least one indentation when the at least one separation medium is being laid and in particular wound.

The at least one channel may be formed almost of itself due to the structure and/or rigidity of the laid—in particular, wound—separation medium. Additional components or tools are thus not required.

The at least one separation medium may be relatively rigid. This makes it possible to form corresponding pleats and/or kinks—which can produce the at least one channel-shaped indentation—when the separation medium is being, in particular, cylindrically laid and in particular wound. The pleats/kinks may automatically extend axially to the element axis, so as to be most suitable as discharge channels.

In another advantageous embodiment, at least one separation medium may at least comprise or be composed of medium fibers, in particular, glass fibers. With medium fibers, it is easy to realize separation media that are only slightly stretchable, or are non-stretchable under normal conditions, at the circumferential surfaces thereof, and that are compressible in the radial direction, i.e., perpendicular to the circumferential surfaces.

Advantageously, a layer thickness of at least one medium layer of the at least one separation medium may be approximately between 0.5 and 5 mm, preferably between 1 and 3 mm, particularly preferably between 1.5 and 2.5 mm.

Advantageously, an inner diameter of the separation element may be approximately between 20 and 500 mm, in particular between 30 and 200 mm, e.g., approximately 47 mm.

Advantageously, a winding thickness of the separation element—i.e., the difference between the outer radius and the inner radius—may be approximately between 4 and 120 mm, in particular between 15 and 25 mm, preferably approximately 20 mm.

The layer thickness, the inner diameter, the outer diameter, and the winding thickness may also be smaller or larger.

Advantageously, the separation element may have approximately between two and 60 medium layers, preferably approximately 12 medium layers, of the at least one separation medium. More or fewer medium layers may also be provided.

Advantageously, a specific minimum bend radius of the at least one separation medium at which the at least one separation medium can be laid circumferentially and in particular cylindrically relative to the element axis without producing kinks or bends, especially due to mechanical tension, may be greater than the inner diameter of the separation element. In other words, the at least one separation medium may be laid, in particular, wound at least in a partial region of the separation element with a bend radius that is smaller than the minimum bend radius, so that the least one channel-shaped indentation is produced automatically when the at least one separation medium is laid and in particular wound.

The specific minimum bend radius of the at least one separation medium is characterized by the stretching properties, in particular, the non-stretchability of the at least one separation medium at the circumferential surfaces thereof, in combination with the compressibility thereof between the circumferential surfaces. The stretching properties may be determined by the rigidity of the at least one separation medium.

The specific minimum bend radius may be determined experimentally by cylindrically bending the separation medium. The radius at which the first kinks or bends are recognizable, in particular, with the unaided eye, in particular, on the radially inward circumferential side can be designated the specific minimum bend radius.

The technical problem is also solved with the separation medium in that a specific minimum bend radius of the at least one separation medium is greater than the inner diameter of the separation element.

The technical problem is also solved with the liquid separator, in that the at least one separation medium is arranged in at least one medium layer circumferentially about an element axis, wherein the at least one separation element is arranged in the housing such that the aerosol can flow through the at least one separation medium radially outwardly from radially inward or radially inwardly from radially outward, relative to the element axis, wherein the element axis extends vertically in space at least with one directional component in the normal operational orientation of the separation element, and wherein at least one medium layer of the at least one separation medium has, on a circumferential surface that is radially inward relative to the element axis, at least one channel-shaped indentation extending axially to the element axis at least with one directional component in order to realize at least one channel for separated liquid.

Advantageously, the housing may have at least one liquid outlet for the separated liquid. Through the liquid outlet, the separated liquid can be removed from the housing.

Finally, the technical problem is solved with the method in that a separation medium is realized as a medium web, the medium web being laid—in particular, wound—circumferentially into a medium winding about an element axis, wherein a radially inner radius of the medium winding is smaller than a specific minimum bend radius of the separation medium at which the separation medium can be bent without pleats and without kinks, such that during laying, at least one channel-shaped indentation extending axially to the element axis at least with one directional component, in order to realize at least one channel for separated liquid, is realized on at least one radially inward circumferential surface of at least one medium layer of the at least one separation medium. For example, first the specific minimum bend radius of a medium web is determined, and then a radially inner radius of the medium web that is smaller than the determined specific minimum bend radius is selected in production. It is also possible to first define an inner radius of the medium winding to be used in a product, and then select a medium or medium web with which the specific minimum bend radius has been determined, preferably in advance, this bend radius being greater than the previously defined inner radius of the medium winding to be realized. In both method variants, however, it is preferable to first determine the specific minimum bend radius of at least one medium or at least one medium web. It is also preferable in both method variants to select a medium that has a specific minimum bend radius that is greater than the radially inner radius of the medium winding.

Moreover, the features and advantages demonstrated in connection with the separation element according to the invention, the separation medium according to the invention, the liquid separator according to the invention, and the method for producing a separation element according to the invention and the respective advantageous embodiments thereof are mutually applicable, mutatis mutandis. It shall be readily understood that the individual features and advantages can be combined with one another, wherein other advantageous effects that go beyond the sum of the individual effects may emerge.

BRIEF DESCRIPTION OF THE DRAWINGS

Other advantages, features, and details of the invention shall be made more apparent by the following description, which addresses an embodiment of the invention in greater detail, with reference to the accompanying drawings. The features disclosed in the drawings, the description, and the claims in combination will be individually considered, as appropriate, and combined into other appropriate combinations by a person skilled in the art. In the schematic drawings.

Identical components are provided with the same reference numbers in the figures.

DETAILED DESCRIPTION

Figure 1:
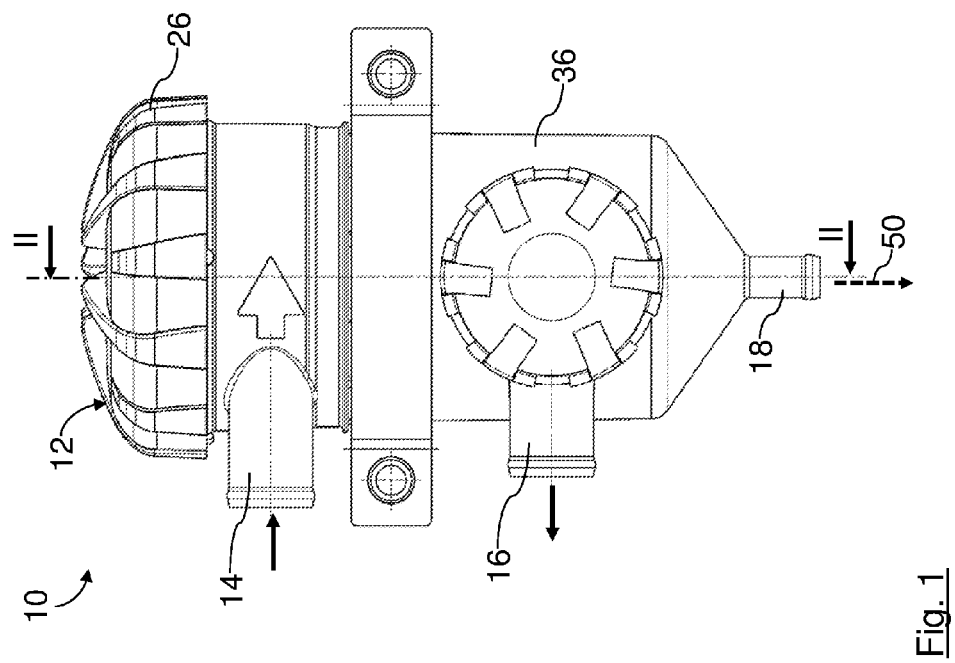
FIG. 1 illustrates an oil separator of a crankcase ventilation system of an internal combustion engine of a motor vehicle.
Figure 4:
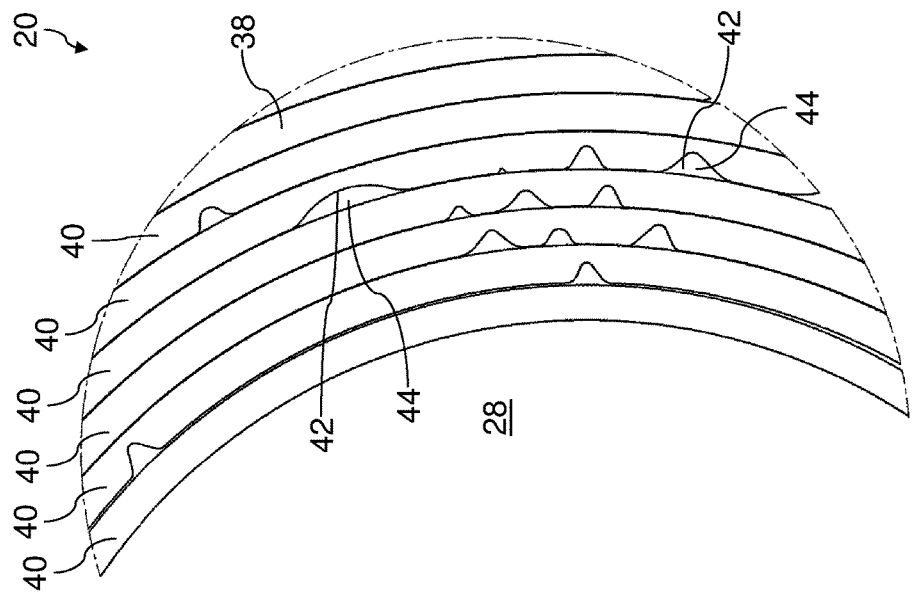
FIG. 4 illustrates a detail view of the cross-section of the separation element from FIG. 3.
Figure 3:
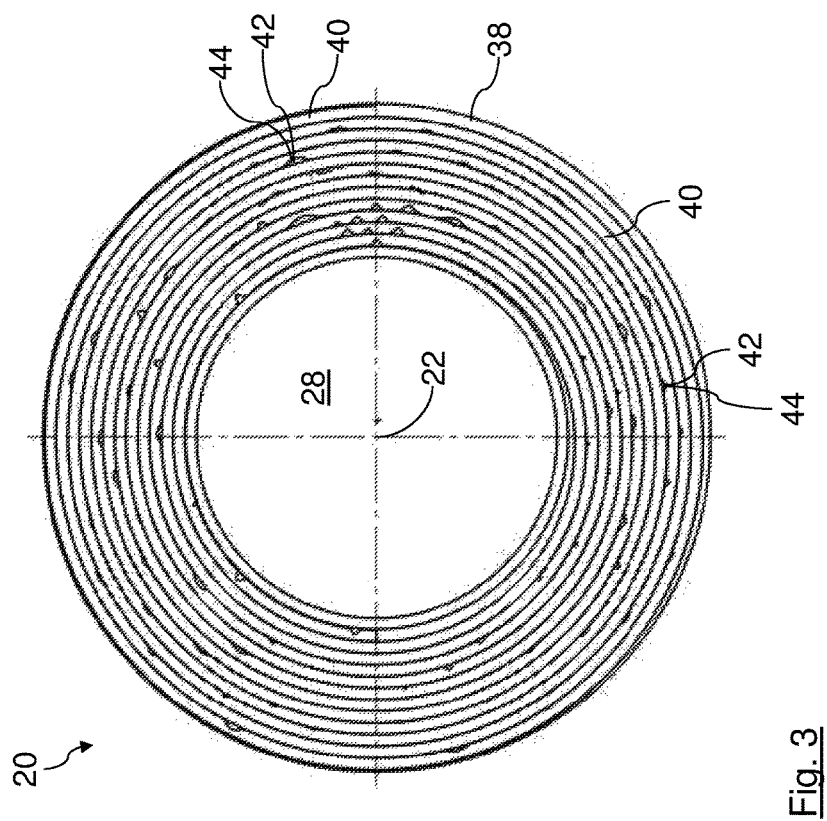
FIG. 3 illustrates a cross-section of a separation element of the oil separator from FIGS. 1 and 2.

FIG. 1 illustrates a side view of oil separator 10 of a known (and not otherwise depicted) crankcase ventilation system of an internal combustion engine of a motor vehicle in a normal operational orientation. The oil separator 10 is used to separate motor oil from crankcase ventilation gas (blowby gas) and return the oil to the motor oil circuit of the internal combustion engine. The blowby gas with the entrained oil exists as an aerosol. The oil separator 10 is arranged in a crankcase ventilation line of the crankcase ventilation system.

The oil separator 10 comprises a two-part openable housing 12 comprising an inlet 14 for blowby gas to be liberated from oil, and an outlet 16 for blowby gas liberated from the oil. The inlet 14 is arranged in a circumferential wall above the outlet 16 in the normal operational orientation of the oil separator 10, as illustrated in FIG. 1. The inlet 14 is connected to the crankcase of the internal combustion engine via a line section (not shown) of the crankcase ventilation line. The outlet 16 is connected to an air intake conduit of the internal combustion engine via another line section (not shown) of the crankcase ventilation line.

The housing 12 is further provided with an oil outlet 18 that leads downward out from the housing 12 in the normal operational orientation. The oil outlet 18 is connected to an oil return line (not shown) that leads to an oil sump of the internal combustion engine.

Figure 2:
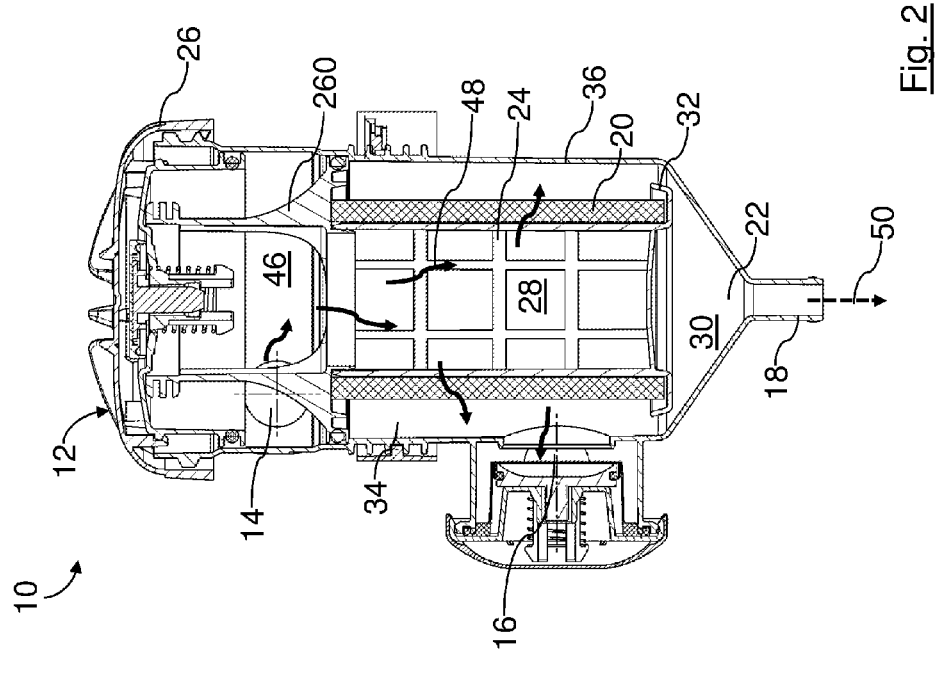
FIG. 2 illustrates a longitudinal section of the oil separator from FIG. 1 along a section line II-II therefrom.

FIG. 2 illustrates a longitudinal section of the oil separator 10 along a section line II-II from FIG. 1. In the housing 12, a separation element 20 is arranged coaxially to an axis 22 so as to separate the inlet 14 from the outlet 16. The blowby gas must flow through the separation element 20 when the oil separator 10 is being operated.

In the present embodiment, the axis 22 coincides with a housing axis of the housing 12 and an element axis of the separation element 20. For the sake of clarity, the term "axis 22" is consistently used hereinbelow. This is used to refer to the element axis, the housing axis, or both, as the context requires. Subsequent discussion of "radial", "axial", "circumferential", "coaxial," or the like is made with respect to the axis 22, unless otherwise indicated.

The separation element 20 illustrated in different sections and detail views in FIGS. 3 to 6 has overall the shape of a round—in particular, circular or oval—hollow cylinder.

The separation element 20 is preferably supported coaxially on a gridlike support tube 24. The support tube 24 may, for example, in turn be fixed to the element cover 260 with an axially upper end, as illustrated in FIG. 2. The separation element 20 is preferably connected—for example, glued or welded—in a sealed manner to the element cover 260. At the end thereof that faces the upper part 26, the support tube 24 is open, so that the interior space thereof, i.e., the element interior space 28 of the separation element 20 is connected to the inlet 14.

On the axially lower end facing away from the upper part 26, the support tube 24 and/or the element bottom 32 are preferably closed, so that the element interior space 28 is also closed there to a collecting space 30 for the separated oil. The collecting space 30 is located below the separation element 20 in the housing 12 in the normal operational position. The oil outlet 18 leads downward out from the collecting space 30.

At the lower end of the separation element 20, which preferably faces the collecting space 30, there is preferably also provided a disc-shaped or annular element bottom 32 that is connected in a sealed manner to the separation element 20. The element bottom 32 extends radially outwardly and circumferentially. The element bottom 32 preferably has an approximately U-shaped profile, which is open upward to the separation element 20 and the upper part 26. This simplifies adhesion to the separation element. The axially lower end face of the separation element 20 is located preferably within the U-shaped profile of the element bottom 32.

The separation element 20 is surrounded radially outwardly by a coaxial outflow-side outlet annular space 34, which is delimited radially outwardly by the circumferential wall of a lower part 36 of the housing 12. The outlet annular space 34 is located on the outflow-side post-filtration gas side of the separation element 20. The outlet annular space 34 is fluidically connected to the outlet 16.

The separation element 20 shall be described in further detail herein below with reference to the detail views and sections from FIGS. 3 to 6. The separation element 20 is composed of a separation medium 38, which is wound circumferentially in a plurality of medium layers 40—for example, 13 medium layers 40—into a coaxial medium winding. An inner diameter and outer diameter of the separation element 20 are, for example, approximately 47 mm and approximately 87 mm, respectively. The separation medium 38 is a glass fiber structure, which is substantially non-stretchable radially outward and radially inward in the axial direction and in the circumferential direction along the circumferential surfaces thereof. The separation medium 38 is compressible in the radial direction. A specific minimum bend radius of the separation medium 38—which results on the one hand from the rigidity along the circumferential surfaces and on the other hand from the compressibility transverse to the circumferential surfaces—is smaller than the inner radius, i.e., half of the inner diameter of the finished medium winding, i.e., of the separation element 20. With the specific minimum bend radius, the separation medium 38 can be bent without forming kinks or bends on the radially inward circumferential surface thereof relative to the bend.

The separation medium 38 is permeable to aerosol in the radial direction. The separation medium acts as a coalescence medium such that oil droplets entrained with the blowby gas are captured at the separation medium 38 and agglomerated into larger oil drops.

The medium layers 40 of the separation medium 38 have a large number of channel-shaped indentations 42, distributed circumferentially. The indentations 42 are respectively located on the radially inward circumferential surface of the corresponding medium layers 40. With the corresponding radially opposite radially outward circumferential surface of the respective radially inward adjacent medium layer 40, the indentations form respective channels 44 for the separated oil.

The indentations 42 and thus the channels 44 may extend each axially, in particular, over the entire axial extension of the separation element 20. However, an advantageous effect also arises if one or more discharge channels 44 extend only over a part of the axial extension of the separation element 20. Provided that the discharge channels extend over the entire axial extension of the separation element 20, they are each open on the upper end face thereof—which faces the element cover 260—and on the lower end face thereof—which faces the element bottom 32.

The indentations 42 and thus the discharge channels 44 of the separation element 20 are partially alike and partially different in the cross-section thereof, i.e., the respective cross-sectional surface and shape thereof. There are regions in which some indentations 42 are distributed circumferentially uniformly. However, the indentations 42 are mostly different and non-uniformly distributed.

To produce the separation element 20, a medium web made of separation medium 38 is wound into a plurality of medium layers 40 about the support tube 24. Due to the rigidity of the separation medium 38 in the circumferential direction and in the axial direction and the connected non-stretchability on the circumferential surfaces thereof, bends, kinks, or pleats form automatically because of the mechanical tension during the winding, the bends, kinks, and pleats extending in the axial direction and locally causing a reduction in the thickness of the medium layer. In the region of the bends, the corresponding indentations 42 are realized during the winding. Then, the radially inward circumferential surface of the separation medium 38 bends radially outward, compressing the material of the separation medium 38 between the radially inward circumferential surface and the radially outward circumferential surface. The layer thickness of the corresponding medium layers 40 is thinner in the region of the indentation 42 than in the adjacent regions. In this manner, the discharge channels 4 are formed automatically during the winding, without the need for additional tools, components, or the like.

The support tube 24 with the finished separation element 20 is preferably fixed onto the element cover 260.

The upper part 26 and the lower part 36 are releasably connected to one another, so as to close off the housing 12. For the purpose of maintenance—in particular, to replace the separation element 20—the upper part 26 and the lower part 36 may be separated from one another, the upper part 26 thus forming a housing cover.

When the internal combustion engine is operating, the blowby gas—loaded with oil—is guided out from the crankcase through the corresponding line section, via the inlet 14, into an inlet space 46 in the upper part of the lower part 36. The blowby gas flows from the inlet space 46 into the element interior space 28 of the separation element 20. The flow of the blowby gas into the oil separator 10 is indicated in FIG. 2 by bent arrows 48.

The blowby gas flows radially outwardly from radially inward through the medium layers 40 of the separation medium 38. The blowby gas is then liberated from the oil.

The blowby gas liberated from the oil arrives at the outlet annular space 34 and leaves the oil separator 10 through the outlet 16. The oil is fed to the air intake conduit via the corresponding line section.

Figure 6:
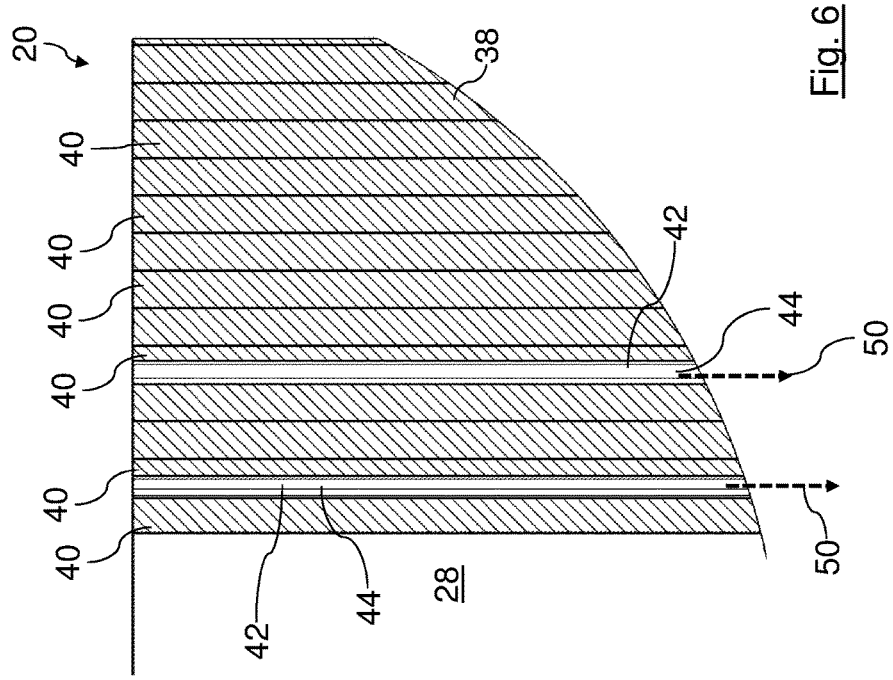
FIG. 6 illustrates a detail view of the longitudinal section of the separation element from FIG. 5.
Figure 5:
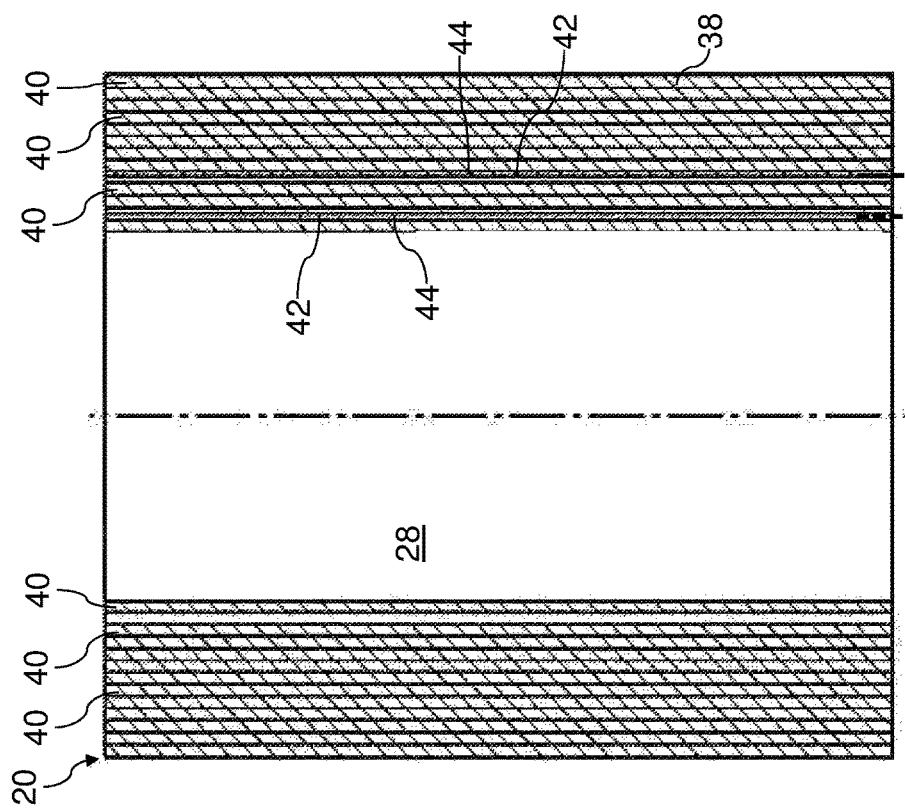
FIG. 5 illustrates a longitudinal section of the separation element from FIGS. 3 and 4.

The oil contained in the blowby gas is retained in the separation medium 38 and agglomerated into larger oil drops. The larger oil drops reach the discharge channels 44. The oil drops then fall downward under the force of gravity, leaving the separation element 20 at the lower end face thereof that faces the element bottom 32. The flow of oil in the separation medium 38, the discharge channels 44, and the housing 12 is indicated in FIGS. 2, 5, and 6 by dashed arrows 50.

The oil reaches the collecting space 30 along the element bottom 32. There, the oil can be discharged continuously or as needed via the oil outlet 18 and fed to the oil sump via the oil return line.

What is claimed is:

1. A separation element of a liquid separator for separating liquid from an aerosol, the separation element comprising:
   at least one separation medium adapted to separate liquid from a gaseous fluid, the separation medium arranged in at least one medium layer extending circumferentially about an element axis;
   wherein the at least one medium layer of the at least one separation medium has, at a radially inward circumferential surface thereof relative to the element axis, a plurality of channel-shaped indentations extending axially to the element axis at least with one directional component;
   wherein axial as used herein is a direction parallel to the element axis;
   wherein radial as used herein is a direction traverse to the element axis;
   wherein the at least one separation medium has a specific minimum bend radius at which the at least one separation medium can be cylindrically wound relative to the element axis without producing kinks or bends forming channel-shaped indentations into a radial inward circumferential surface of the at least one medium layer;
   wherein the at least one medium layer is wound about the element axis, having a radially inner side of the at least one separation medium defining an inner diameter of the separation element; and
   wherein the specific minimum bend radius of the at least one separation medium is greater than the inner diameter of the separation element, producing kinks or bends into the radial inward inner circumferential surface of the at least one medium layer, the kinks or bends compressing material of the at least one medium layer between the radial inward circumferential surface and a radial outward circumferential surface of the at least one medium layer at the kinks or bends, forming the plurality of channel-shaped indentations into the deformed radial inward circumferential surface of the at least one medium layer.

2. The separation element according to claim 1, further comprising:
   a support body;
   wherein at least one portion of the at least one separation medium in a plurality of medium layers is wound circumferentially about the element axis on the support body.

3. The separation element according to claim 1, wherein the plurality of channel-shaped indentations are uniformly distributed circumferentially on the radially inward circumferential surface of the at least one medium layer; and/or
   the plurality of channel-shaped indentations are non-uniformly distributed circumferentially on the radially inward circumferential surface of the at least one medium layer.

4. The separation element according to claim 1, wherein at least two channel-shaped indentations of the plurality of channel-shaped indentations are different with respect to cross section shapes thereof and/or the cross-sectional surfaces thereof, taken transversely to a flow path of the separated liquid; the respective cross-sections, the cross section shapes thereof and/or the cross-sectional surfaces thereof-transversely to the flow path of the separated liquid, and/or at least two channel-shaped indentations of the plurality of channel-shaped indentations are identical with respect to the respective cross-sections thereof.

5. The separation element according to claim 1, wherein at least one channel-shaped indentation of the plurality of channel-shaped indentations extends to a margin of the at least one separation medium that is spatially downward in the normal operational orientation and extends over an entire axial extension of the at least one separation medium relative to the element axis.

6. The separation element according to claim 1, wherein the at least one separation medium in the area of the plurality of channel-shaped indentations is bent exclusively at a radially inward circumferential surface of the at least one separation medium, or at a radially indented and radially outward circumferential surfaces.

7. The separation element according to claim 1, wherein the at least one separation medium comprises
   at least one embossment and/or punch arranged on the plurality of channel-shaped indentations, at least on the radially inward circumferential surface relative to the element axis.

8. The separation element according to claim 1, wherein the at least one separation medium at least comprises medium fibers of glass fibers.

9. The separation element according to claim 1, wherein the at least one separation medium is configured and adapted to separate oil from an air/oil fluid stream of a crankcase ventilation system of an internal combustion engine or a compressor.

10. A liquid separator for separating liquid from an aerosol, the separation element comprising:
    a housing that has
      at least one aerosol inlet for the aerosol;
      at least one gas outlet for gas liberated from the liquid
      at least one separation element, comprising:
        at least one separation medium adapted to separate liquid for a gaseous fluid, the separation medium arranged in at least one medium layer extending circumferentially about an element axis;
        wherein at least one medium layer of at least one separation medium has, at a radially inward circumferential surface thereof relative to the element axis, a plurality of channel-shaped indentations extending axially to the element axis at least with one directional component;
        wherein axial as used herein is a direction parallel to the element axis;
        wherein radial as used herein is a direction traverse to the element axis:
        wherein the at least one separation medium has a specific minimum bend radius at which the at least one separation medium can be cylindrically wound relative to the element axis without producing kinks or bends forming channel-shaped indentations into a radial inward circumferential surface of the at least one medium layer;
        wherein the at least one medium layer is wound about the element axis, having a radially inner side of the at least one separation medium defining an inner diameter of the separation element; and
        wherein the specific minimum bend radius of the at least one separation medium is greater than the inner diameter of the separation element, producing kinks or bends into the radial inward inner circumferential surface of the at least one medium layer, the kinks or bends compressing material of the at least one medium layer between the radial inward circumferential surface and a radial outward circumferential surface of the at least one medium layer at the kinks or bends, forming the plurality of channel-shaped indentations into the deformed radial inward circumferential surface of the at least one medium layer;

wherein the at least one separation medium is configured and adapted to separate oil from an air/oil fluid stream of a crankcase ventilation system of an internal combustion engine or a compressor; and wherein the separation medium is bent with a bend radius that is smaller than a specific minimum bend radius of the at least one separation medium;

wherein the at least one separation element is arranged in the housing such that the aerosol flows through the at least one separation medium radially outwardly from radially inward or radially inwardly from radially outward relative to the element axis;

wherein the element axis extends vertically in space in the normal operational orientation at least with one directional component; and wherein the at least one medium layer of the at least one separation medium has, on a radially inward circumferential surface relative to the element axis, at least one channel-shaped indentation of the plurality of channel-shaped indentations extending axially to the element axis at least with one directional component, in order to realize at least one channel for separated liquid.

11. A method for producing a separation element of a liquid separator, comprising the steps of:

providing a separation medium realized as a medium web;

wherein the at least one separation medium has a specific minimum bend radius at which the at least one separation medium can be cylindrically wound relative to the element axis without producing kinks or bends forming channel-shaped indentations into a radial inward circumferential surface of the at least one medium layer;

winding the separation medium circumferentially around an element axis at a radius smaller than the specific minimum bend radius, producing kinks or bends into the radial inward inner circumferential surface;

compressing material of the at least one medium layer between the radial inward circumferential surface and a radial outward circumferential surface of the at least one medium layer at the kinks or bends;

forming a plurality of channel-shaped indentations into the radial inward circumferential surface at the kinks or bends;

wherein the plurality of channel-shaped indentations are configured to receive separated liquid.

\* \* \* \* \*